Patented Feb. 24, 1931

1,794,259

UNITED STATES PATENT OFFICE

THEODOR THORSSELL AND AUGUST KRISTENSSON, OF KASSEL, GERMANY

PRODUCTION OF ALKALI SULPHATES

No Drawing. Application filed May 3, 1929, Serial No. 360,318, and in Germany May 7, 1928.

According to our prior application Serial No. 319,006, filed November 12, 1928, potassium sulphate is prepared by the conversion of potassium chloride with magnesium sulphate in an ammoniacal solution of ammonium chloride.

With the help of this process a suitable crude potash salt can be worked up very advantageously according to the present invention, in such a way, that all its constituents are obtained in refined products which are commercially pure.

Suitable crude salts for this process are those sylvinitic salts, which in addition to potassium chloride and sodium chloride contain chiefly kieserite.

In order to carry out the process, the composition of the crude salt must first of all be so adjusted that the ratio between potassium chloride and kieserite is approximately the right one. This can either be done by mixing different batches of salt from the mine or by adding potassium chloride or the mixture of kieserite and sodium chloride obtained in the manufacture of potassium chloride and which has hitherto been discarded.

Since kieserite—as is known—is not reactive in itself, it is first hydrated to magnesium sulphate. In order to facilitate this hydration, the crude salt is preferably roasted or finely ground prior to being used for manufacture. The crude salt prepared in this way is heated with mother liquor from a preceding operation which is as free from ammonia as possible or poor in ammonia, in which case the said hydration of the kieserite takes place readily. The mother liquor must be as free from ammonia as possible, because ammonia hinders hydration. When the latter is ended, the mixture is cooled and ammonia introduced, in which case the heat of solution of the ammonia must be eliminated by cooling, so that the temperature remains practically constant.

When the reaction is complete the substance settled at the bottom consists of potassium sulphate and sodium sulphate, in which however—if proper conditions are maintained in regard to amount of ammonia and temperature—the content of sodium sulphate is substantially less than in glaserite

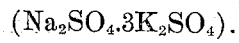

$(Na_2SO_4 \cdot 3K_2SO_4)$.

The settled substance is separated and stirred or covered with cold water, in which case sodium sulphate, and high-percent potassium sulphate remains behind. This stirring or covering liquor is returned to the process after the hydration and prior to the introduction of the ammonia.

The mother liquor contains ammonia, ammonium chloride, potassium chloride and sodium chloride. By introducing carbon dioxide, the magnesia is precipitated as magnesium ammonium carbonate. This precipitation of magnesia takes place practically quantitatively, so that the liquor then contains ammonium carbonate, sodium chloride and a larger quantity of ammonium chloride. The magnesium ammonium carbonate is a good initial material for the preparation of other magnesium compounds, in which case ammonia and carbon dioxide are recovered for the process.

When magnesium ammonium carbonate is dried, ammonia, carbon dioxide and water of crystallization are given off, and magnesium carbonate is obtained. If heated to a further extent, a further amount of carbon dioxide is given off, so that finally magnesium oxide remains behind. Magnesium ammonium carbonate or magnesium carbonate heated with ammonium chloride, supply anhydrous magnesium chloride whereas ammonia and carbon dioxide are recovered for the process.

The magnesium ammonium carbonate mother liquor is cooled, as a result of which the majority of its ammonium chloride is precipitated. If magnesium ammonium carbonate is not taken out separately before this cooling, the above-mentioned mixture of ammonium chloride and magnesium ammonium carbonate is obtained which after drying and calcination gives anhydrous magnesium chloride, returning carbon dioxide and ammonia for the process.

By introducing carbon dioxide into the ammonium chloride mother liquor containing ammonium carbonate, the sodium of the sodium chloride contained therein, is precipitated and separated as sodium bicarbonate.

The bicarbonate mother liquor contains mainly ammonium chloride with ammonium bicarbonate and sodium chloride. It is heated for the purpose of removing carbon dioxide and ammonia and used for the treatment of the crude salt mentioned at the outset, the process being thus made into a continuous cycle process.

In conclusion it is emphasized that the present invention being a further development of the above mentioned copending application uses the basic idea whereby $K_2SO_4$ is produced directly from a sylvinitic potash salt chiefly containing kieserite, while the other contents of the crude salt are obtained as commercial products, so that Mg is obtained from $MgCO_3$; Na from $Na_2CO_3$ and Cl in the form of $NH_4Cl$.

The mother liquor obtained at the termination of the process consists of an $NH_4Cl$ solution, and when such a solution is to be used during a crude salt treatment in the beginning of the process, this invention describes the use of the said mother liquor for this purpose. In this manner a closed ring process is created, which is exceedingly important for the manufacture on a large scale.

A diagrammatic example of this method follows:

*Example*

| | $H_2O$ | K | Na | $NH_4$ | Mg | H | Cl | $SO_4$ | $CO_3$ | OH |
|---|---|---|---|---|---|---|---|---|---|---|
| Main process | kg. | kg. | kg. | kg. | kg. | kg. | kg. | kg. | kg. | kg. |
| Initial liquor | 3000 | 186 | 122 | 229 | | | 767 | 55 | | |
| The liquor is heated with 1000 kg. crude salt=329 kg. KCl, 217 kg. $MgSO_4$+aq. 360 kg. NaCl | +40 | +168 | +142 | | +52 | | +371 | +206 | | |
| There are introduced at 40° 400 kg. $NH_3$+318 kg. $H_2O$ | −106 | | | +423 | | | | | | +400 |
| Precipitated 596 kg. glaserite+KCl are separated | | −250 | −25 | | | | −105 | −217 | | −300 |
| 300 kg. $NH_3$+318 kg. $H_2O$ are drawn off | | | | −318 | | | | | | |
| A mixture of 200 kg. $NH_3$+380 kg. $CO_2$+212 kg. $H_2O$ is introduced | −155 | | | +212 | | +174 | | | +518 | +200 |
| Precipitated salt 540 kg. $Mg(NH_4)_2(CO_3)_2+4$ aq. is separated | −154 | | | −77 | −52 | | | | −257 | |
| | | | | −189 | | | −371 | | | |
| 560 kg. $NH_4Cl$ are precipitated by cooling | | | | | | | | | | |
| 100 kg. $NH_3$+460 kg. $CO_2$+106 kg. $H_2O$ are introduced in the mother liquor | −188 | | | +106 | | +21.1 −6.2 | | | +627 −369 | +100 |
| Precipitated salt 517 kg. $NaHCO_3$ is separated | | | −142 | | | | | | | |
| The liquor is heated for the purpose of inspissating and removing $NH_3$ and $CO_2$. 148 kg. $NH_3$, 380 kg. $CO_2$ and 617 kg. $H_2O$ are removed | −460 | | | −157 | | −8.7 −23.6 | | | −519 | −400 |
| Conversion H+OH=$H_2O$ | +423 | | | | | | | | | |
| The liquor together with the sulphate mother liquor is used as initial liquor | 2400 | 104 | 97 | 229 | | | 662 | 44 | | |
| Manufacture of sulphate | | | | | | | | | | |
| Glaserite+KCl | | 250 | 25 | | | | 105 | 217 | | |
| The salts are subjected to agitation with 600 kg. $H_2O$ | +600 | | | | | | | | | |
| 374 kg. $K_2SO_4$ are obtained as product | | −168 | | | | | | −206 | | |
| The sulphate mother liquor together with the inspissated bicarbonate mother liquor is used as initial liquor | 600 | 82 | 25 | | | | 105 | 11 | | |
| Manufacture of magnesium chloride | | | | | | | | | | |
| $Mg(NH_4)_2(CO_3)_2+4$ aq | 154 | | | 77 | 52 | | | | 257 | |
| There are removed by drying at 100°: 73 kg. $NH_3$+94 kg. $CO_2$+193 kg. $H_2O$ | −154 | | | −77 | | | | | −128 | |
| Dry residue 180 kg. $MgCO_3$ | | | | | 52 | | | | −127 | |
| The $MgCO_3$ is mixed with 250 kg. $NH_4Cl$ and heated to 360°. There are removed 21 kg. $NH_4Cl$, 73 kg. $NH_3$, 94 kg. $CO_2$ and 39 kg. $H_2O$ | | | | +84 −84 | | | 166 15 | | 127 | |
| Residue 203 kg. $MgCl_2$=product | | | | | 52 | | 151 | | | |
| Manufacture of soda | | | | | | | | | | |
| Sodium bicarbonate | | | 142 | | | 6.2 −6.2 | | | 369 −184 | |
| When calcining, 135 kg. $CO_2$ and 55 kg. $H_2O$ are removed | | | | | | | | | | |
| Residue 327 kg. $Na_2CO_3$=product | | | 142 | | | | | | 185 | |

| Balance of ammonia and carbonic acid | $NH_3$ | $CO_2$ |
|---|---|---|
| | kg. | kg. |
| Employed: | | |
| Glaserite separation | 400 | |
| Double-carbonate separation | 200 | 380 |
| Bicarbonate precipitation | 100 | 460 |
| | 700 | 840 |
| Obtained: | | |
| Evaporating after glaserite separation | 300 | |
| Drying $Mg(NH_4)_2(CO_3)_2+4$ aq | 73 | 94 |
| Manufacture of magnesium chloride | 73 | 94 |
| Liquor inspissation | 148 | 380 |
| Manufacture of soda | | 135 |
| Consumption | 106 | 137 |

Having now particularly described and ascertained the nature of our said invention and in what manner the same is to be performed, we declare that what we claim is:—

1. A process for working up crude sylvinitic potash salts containing kieserite, consisting in hydrating the kieserite contained in crude sylvinitic potash salts, treating the said salts with an ammoniacal solution of ammonium chloride, removing the potassium sulphate containing sodium sulphate, treating the mother liquor with carbon dioxide for the purpose of precipitating magnesium ammonium carbonate, cooling the said mother liquor in order to remove a portion of the ammonium chloride contained therein and treating the remaining mother liquor with carbon dioxide for the purpose of precipitating sodium bicarbonate, as set forth.

2. A process as claimed in claim 1 and in which the said potassium sulphate containing sodium sulphate is treated with water for the purpose of removing its content of sodium sulphate, and the resulting solution returned to the process, as set forth.

3. A process as claimed in claim 1 and in which the said magnesium ammonium carbonate is heated to a slight extent, ammonia and carbon dioxide being recovered for the process and magnesium carbonate obtained, as set forth.

4. A process as claimed in claim 1 and in which the said magnesium carbonate and ammonium chloride are mixed and heated for the purpose of recovering ammonia and carbon dioxide for the process and obtaining anhydrous magnesium chloride as product, as set forth.

5. A process as claimed in claim 1 and in which the said magnesium ammonium carbonate and ammonium chloride are separated together for the recovery of ammonia and carbon dioxide for the process, and thereupon heated together, anhydrous magnesium chloride being obtained, as set forth.

6. A process as claimed in claim 1 and in which the said magnesium ammonium carbonate and ammonium chloride are separated each individually for the recovery of ammonia and carbon dioxide, and heated in mixture, anhydrous magnesium chloride being obtained, as set forth.

In testimony whereof we have signed our names to this specification.

THEODOR THORSSELL.
AUGUST KRISTENSSON.